Figure 1:
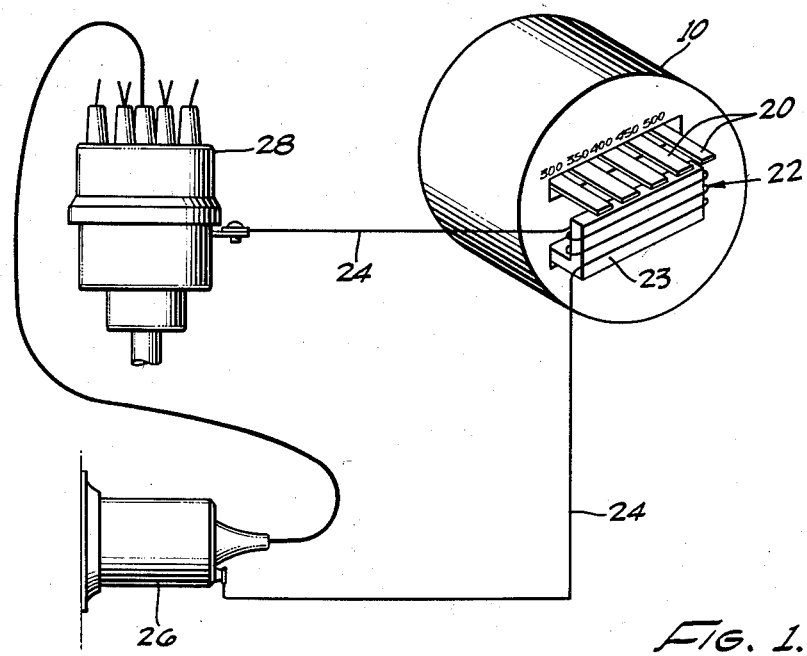

Feb. 23, 1960  J. D. STAGGS  2,926,303
ENGINE-SPEED INDICATING SYSTEM
Filed Feb. 20, 1956

JESSE D. STAGGS
INVENTOR.

BY Lyon & Lyon
ATTORNEYS

United States Patent Office 2,926,303
Patented Feb. 23, 1960

2,926,303

ENGINE-SPEED INDICATING SYSTEM

Jesse D. Staggs, Burbank, Calif.

Application February 20, 1956, Serial No. 566,558

1 Claim. (Cl. 324—70)

This invention relates to engine-speed indicating apparatus and, more particularly, to an improvement therein.

In order to properly adjust an automatic transmission system which is to be driven by an internal-combustion engine, such as a gasoline engine of an automobile, it is necessary to know when the engine reaches the proper idling speed. Thus, an indicator of the speed or revolutions per minute of the engine is required, in order to inform the mechanic when such idling speed is reached.

One presently favored speed indicator is the stroboscopic lamp which, from timed flashes on the rotating crankshaft, can enable the engine speed to be detected. However, this usually requires an external power supply or electrical outlet. This is not always convenient, and a dangling power cord which must be plugged into a power plug for power for the stroboscopic speed indicator is a nuisance. A tachometer may also be employed of the type which requires contact with the rotating shaft of the internal-combustion engine, but this is always a nuisance to employ and is not always practical.

An object of the present invention is to provide a novel and simple speed indicator of an internal-combustion engine.

Another object of the present invention is to provide a useful method and apparatus for determining the speed of an internal-combustion engine.

Yet another object of the present invention is to provide a speed indicator for an internal-combustion engine which is not mechanically coupled to said engine.

Still another object of the present invention is the provision of a speed indicator for an internal-combustion engine which does not require external power supplies nor operation in proximity to a moving portion of the internal-combustion engine.

These and other features of the invention are achieved by employing a tuned-reed type of tachometer wherein the reeds are actuated by an electromagnet which is inductively coupled into the ignition system of an engine. The electromagnet may be excited by a winding formed from one or more turns of a lead which connects the primary winding of the ignition coil to the distributor. This lead carries current which is interrupted by the distributor of the internal-combustion engine at a frequency directly related to the engine speed. The one of the plurality of reeds which is tuned to resonate at the frequency of the current passing through the winding will be readily visible and identifiable. Since the engine speed varies directly with the ignition-current pulses, the reed which indicates such frequency also indicates the proper speed of the internal-combustion engine. The calibration of the reeds from frequency to speed is an extremely simple matter. Coupling of the reed tachometer to the engine, as well as uncoupling, may be done simply by wrapping or unwrapping one or more turns of the lead from the distributor to the ignition-coil primary winding. Alternatively, the reed tachometer may have an electromagnetic coil with external leads which may be connected in place of the above-mentioned lead, or where the coil resistance is high between one end of the lead and ground.

Figure 2:
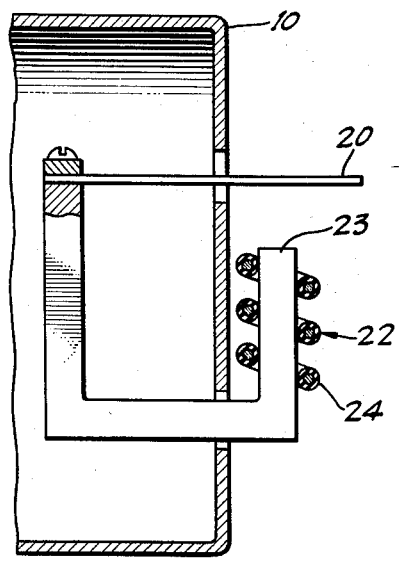

The novel features that are considered characteristic of this invention are set forth with particularity in the appended claim. The invention itself, both as to its organization and method of operation, as well as additional objects and advantages thereof, will best be understood from the following description when read in connection with the accompanying drawings, in which:

Figure 1 represents the arrangement of an embodiment of the invention in conjunction with the distributor of an internal-combustion engine; and Figure 2 is a cross-section of the reed tachometer which is employed in Figure 1.

Referring now to Figure 1, there may be seen an arrangement of an embodiment of the invention. This comprises a reed tachometer 10 which has a plurality of resonant reeds 20, each one of which resonates at a different frequency. The resonant reeds are actuated by means of an electromagnet 22 inductively coupled into the ignition system of an engine. The coupling may be formed by winding around the polepiece 23 a few turns of the lead 24 which extends between the primary winding of the ignition coil 26 and the distributor 28.

As is known, the ignition coil consists of a step-up transformer, the primary winding of which is excited by the battery. The lead from the primary winding is brought to the distributor 28 for the purpose of breaking the current so that the ignition coil may effectively operate as a transformer. The distributor has a central rotary post which is driven by gears from the engine. Therefore, this rotary post operates at a speed related to the speed of the engine. Contact points carrying the current from the ignition coil are opened and closed by a cam surface which is on the rotor of the distributor. Thus, effectively, the current flowing through the primary lead 24 is broken or pulsed at a frequency which is determined by the speed of the engine. Since the coil wrapped around the polepiece 23 of the electromagnet is formed by the turns of the lead 24 which are wrapped around the polepiece 23, the reeds will have applied thereto a magnetic field which has the frequency of the ignition-coil current.

As is well known, the only one of the reeds which will resonate is the one which is tuned to resonate at the frequency of the varying magnetic field being applied thereto. Thus, if each one of these reeds is tuned to resonate at a frequency which is representative of the engine speeds over the range desired to be observed when the engine speed is within this range, a given one of these reeds will have an amplitude of vibration which is very much greater than that of any of the adjacent reeds. This reed is readily detected. As shown on the casing 10, the range of speeds desired may vary between 300 to 500 r.p.m.

Accordingly, the method of operation presented here is to take a tuned-reed tachometer, wrap one or more turns of the lead between the primary of the ignition coil and the distributor around the polepiece of the tachometer, so that the tuned-reed tachometer has an electromagnet formed therein. The engine is then started and allowed to run. The idling speed is adjusted until the tuned-reed tachometer indicates it is within the range or at the desired value. Then, any other mechanical work which must be done, such as setting the automatic transmission, can be accomplished. Even without this, the exact setting of the idling speed of an engine is important, since it is this speed which determines to a large extent the efficiency of the use of fuel in most cars. The tachometer may be readily removed from the position of utility by merely unwrapping the lead between the ignition coil and the distributor. The lead, if of insufficient length, may readily be replaced by a lead having sufficient length, since the connections between the ignition coil and the distributor are made by screw-connected terminals.

Preferably, the resonant-reed tachometer may be provided with the electromagnet completed and only the ends of the lead 24—24 extending from the case. These ends may be fastened respectively to the distributor and ignition coil and the usual lead temporarily removed. Thus, the appearance would be the same as shown in Figure 1, except that the electromagnet is completely within the case 10. Alternative to the above, if the coil of the electromagnet is made so that its resistance is high enough it is possible to clip one end to either the ignition coil or distributor and the other end to be grounded on a convenient portion of the motor. In effect, the ignition coil is shunted thereby. The current required to excite the electromagnet is so small as not to affect normal operation of the engine. The above expedients may also be considered as inductively coupling a lead in the ignition system to the polepiece of the reed tachometer.

Thus there has been shown and described hereinabove a novel, useful, and simple arrangement for accurately determining the idling speed of an internal-combustion engine. Although the arrangements described herein in effect use the lead between the ignition coil and distributor to form the electromagnet for the vibrating-reed tachometer, it will be apparent to those skilled in the art that any other source of electricity in an engine which occurs at a frequency which is related to the speed of operation of the engine may be employed in the manner described above to provide a fluctuating field to operate a reed tachometer to determine the speed of the engine.

I claim:

The method of adjusting the speed of operation of an engine by means of a plurality of reeds, a pole piece positioned in operative relation to all said reeds, all of said reeds being capable of being vibrated by a fluctuating magnetic field, each of said reeds resonating at a different frequency representative of a different engine speed, and a scale adjacent to said reeds having markings associated with each reed for visually identifying the engine speed at which a reed is resonated, said engine having an ignition system wherein there is generated a current interrupted at a rate which is directly related to the speed of operation of said engine, said method comprising applying said current to said pole piece for establishing a magnetic field common to all said reeds which fluctuates at the rate of said current interruptions, varying the speed of operation of said engine, and observing the markings on said scale while varying the speed of operation of said engine until the one of said plurality of reeds vibrating at resonance is the one associated with a marking indicating the desired adjusted speed of said engine.

References Cited in the file of this patent

UNITED STATES PATENTS

| | | |
|---|---|---|
| 759,513 | Frahm | May 10, 1904 |
| 831,180 | McGarvey | Sept. 18, 1906 |
| 1,015,192 | Knopp | Jan. 16, 1912 |
| 1,761,908 | Eshbaug | June 3, 1930 |
| 2,226,185 | Sturm | Dec. 24, 1940 |
| 2,447,191 | Lingel | Aug. 17, 1948 |
| 2,726,647 | Molyneux | Dec. 13, 1955 |
| 2,773,238 | Petroff | Dec. 4, 1956 |